United States Patent [19]

Mimata

[11] 4,016,855

[45] Apr. 12, 1977

[54] GRINDING METHOD

[75] Inventor: Tsutomu Mimata, Tokyo, Japan

[73] Assignee: Hitachi, Ltd., Japan

[22] Filed: Aug. 28, 1975

[21] Appl. No.: 608,733

[30] Foreign Application Priority Data

Sept. 4, 1974  Japan ............................ 49-100920

[52] U.S. Cl. .............................. 125/13 R; 51/267; 51/283; 51/322
[51] Int. Cl.² .......................................... B28D 1/04
[58] Field of Search ................ 125/12, 13; 51/267, 51/322, 283

[56] References Cited

UNITED STATES PATENTS

| 2,911,773 | 11/1959 | Gobat | 125/13 R X |
| 3,672,099 | 6/1972 | Parkhurst | 125/13 R |
| 3,831,576 | 8/1974 | Mech | 125/12 |

Primary Examiner—Harold D. Whitehead
Attorney, Agent, or Firm—Craig & Antonelli

[57] ABSTRACT

A method for segmenting a plate-like material, particularly a semiconductor wafer on which a plurality of elements are formed in regular arrangement, is provided. Segmentation is performed while flowing a fluid over the entire surface of the plate-like material to wash the surface thereof.

10 Claims, 2 Drawing Figures

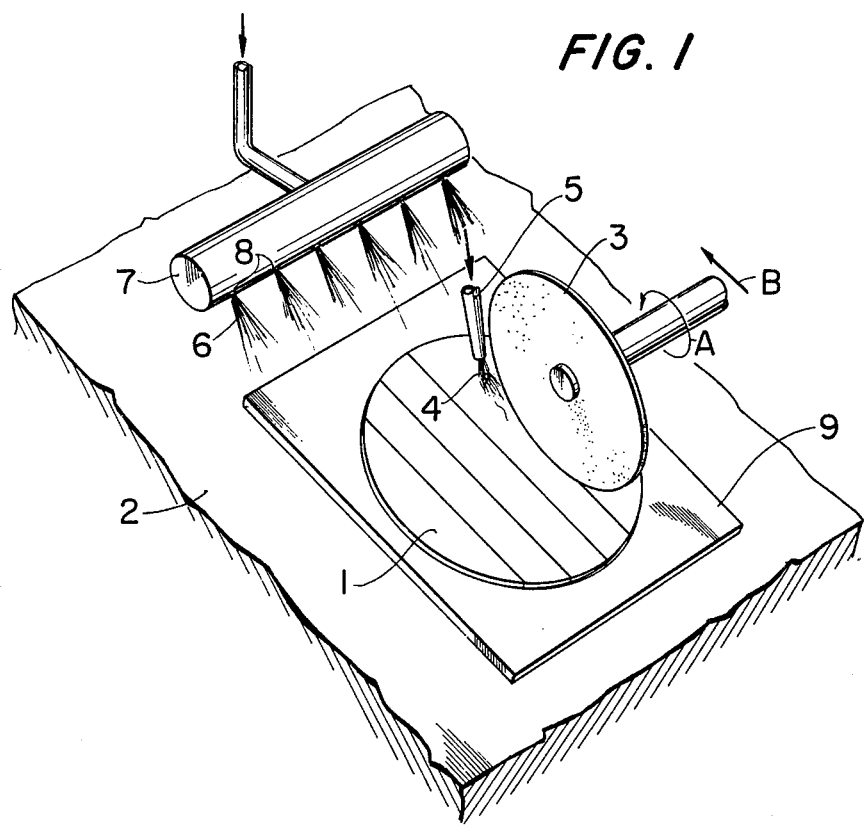
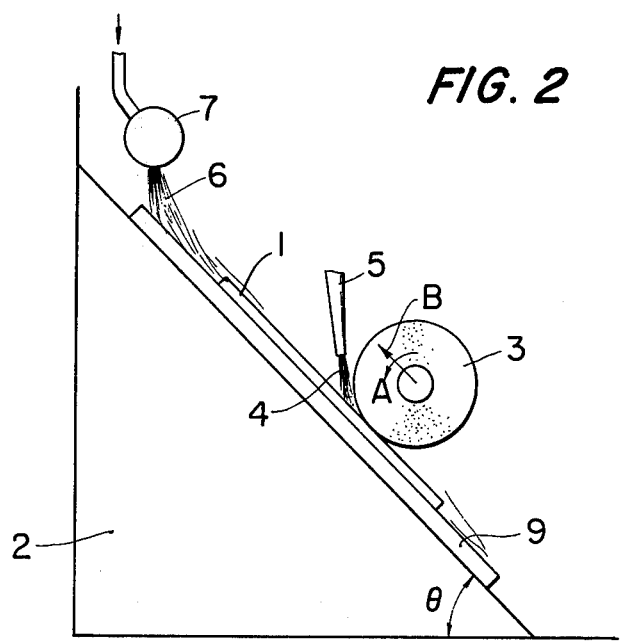

GRINDING METHOD

BACKGROUND OF THE INVENTION

The present invention relates to a method for segmenting a plate-like material, particularly a method of segmenting a semiconductor wafer having a plurality of regularly arranged elements thereon into pellets including the individual elements.

In the manufacture of semiconductor devices, there are generally involved the steps of forming a plurality of regularly arranged elements in one main surface of the semiconductor wafer by performing diffusion, evaporation and other treatments on the surface, and then segmenting the semiconductor wafer into pellets including the respective elements.

For the purpose of segmenting the semiconductor wafer into individual pellets, as for instance disclosed in Japanese Patent Publication No. 21421/1973, it is customary to form longitudinal and latitudinal scribed grooves between the respective elements on the wafer by a diamond cutter, and then perform cracking along the respective grooves to thereby obtain semiconductor pellets.

However, according to such a segmentation method, the scribed grooves formed by a diamond cutter are shallow and hence, when cutting out the individual pellets by performing cracking along the scribed grooves, fissures or fractures could be produced in the portions other than the grooves to cause flaws or ruptures in the resultant semiconductor pellets. Also, imperfect segmentation could occur to form two or more unseparated pellets.

For these reasons, the conventional scribing method using a diamond cutter is being superseded by a grinding method using a rotary grinder having at its outer periphery a cutting blade made of diamond grains.

In the grinding method using a rotating grinder blade, grinding work must be carried on while constantly supplying cooling water as well as liquid lubricant to the ground portion and the blade where high heat could otherwise generate during the work. In this case, cuttings such as silicon swarfs driven out along with cooling water migrate on the upper surface of the semiconductor wafer, so that if such cuttings are once deposited on the wafer, it is extremely hard to wash them away in the subsequent cleaning step.

SUMMARY OF THE INVENTION

The present invention has been devised for overcoming the above-mentioned problems and difficulties inherent in the conventional methods, and hence the primary object of the present invention is to provide a method of segmenting a plate-like material such as a semiconductor wafer whereby perfect segmentation can be accomplished without producing any cut or rupture in the work while keeping the work surface free from the deposition of a cuttings which might soil the work surface.

According to the studies by the present inventor on the deposition of a cuttings on the wafer surface, it was found that it is extremely difficult to effectively wash away the cuttings even when the washing is carried out immediately after cutting (that is, when the wafer is still in a wet state), let alone when the wafer has been dried with the cuttings deposited thereon. That is, if the cuttings once settle on the wafer, no satisfactory cleaning effect can be obtained. According to the present invention, this problem is overcome by washing away the cuttings forced out by grinding before they settle on the wafer. More specifically, segmentation of the plate-like material is practiced by a rotating grinder blade while washing the plate surface by flowing a fluid over the entire surface of the plate-like material or by flowing the fluid downwardly over the plate-like material which is arranged on an incline.

Other objects and features of the present invention will become apparent from the following detailed description of preferred embodiments of the invention as taken in conjunction with the accompanying drawings.

BRIEF DESCRIPTION OF THE INVENTION

FIG. 1 is a perspective view showing a condition where a semiconductor wafer is being cut according to one embodiment of the method of the present invention; and FIG. 2 is a side view showing another embodiment of the present invention.

DESCRIPTION OF THE PREFERRED EMBODIMENTS

Referring first to FIG. 1, there is diagrammatically shown a condition where a semiconductor wafer is being cut according to the method of the present invention.

First, the cutting or segmenting device used in the method of the present invention will be described. There is provided a platen 2 on which a semiconductor wafer 1 is placed, and a blade 3 for cutting the wafer is rotatably mounted thereabove. Also provided sidewise of the blade 3 is a cooling water supply pipe 5 for spraying cooling water 4 to the cut portion. Above one end of the platen 2 there is provided a washing water supply pipe 7 for supplying washing water 6 for washing the surface of the semiconductor wafer 1. This washing water supply pipe 7 is provided with a plurality of equidistantly arranged water outlets 8 from which washing water 6 is ejected for washing the entire surface of the semiconductor wafer.

The semiconductor wafer 1 to be scribed is fixedly bonded on a wafer support 9 made of synthetic resin or the like, and this assembly is placed on the platen 2 of the cutting device such that the cross lines sectioning the respective elements will run along and parallel to the blade 3. Then the blade 3 is rotated in the direction of arrow A at the rate of 18,000 to 30,000 rotations per minute in registration with the cross lines sectioning the elements on the wafer while simultaneously moving the blade in the direction of arrow B. It is to be noted that before starting the grinding operation, cooling water 4 is sprayed from the cooling water supply pipe 5 mounted sidewise of the blade 3 at the rate of about 1l per minute, and this cooling water spray is continued during the grinding operation to prevent heating of the cut portion. Also, washing water 6 is ejected in the cutting direction from the water outlets 8 in the washing water supply pipe 7 provided at one end of the platen 2 at the rate of about 4l per minute so that the cutting operation is performed while washing the surface of the wafer 1. This washing water 6 is kept flowing during the period from completion of grinding along one cross line until the start of grinding along the next cross line. When grinding for all of the cross lines has been completed, the blade is moved away from the position immediately above the wafer to a position sidewise thereof and the flow of cooling water is stopped. Rotation of the blade is also stopped while giving care so that no foul matter deposits on the wafer. Washing water 6 is sprayed until the cuttings are perfectly washed away. Similar cutting operation is conducted along each of the longitudinal lines sectioning the respective elements on the wafer, and then the wafer is segmented into pellets and then removed from the wafer support 9 to obtain individual semiconductor pellets.

As described above in the foregoing embodiment, it is possible according to the present invention to perfectly segment the semiconductor wafer by a blade, and no fissure or rupture is produced in the semiconductor pellets during cracking. Further, the upper surface of the wafer is always kept clean, since the cuttings such as silicon dust are washed away by washing water.

Referring now to FIG. 2, there is shown another embodiment of the present invention. In this embodiment, the platen 2 is slanted at an angle $\theta$ of 45° relative to the horizontal line (this angle $\theta$ may be changed if desired). Washing water flows down over the slant semiconductor wafer affixed to the platen surface, so as to effect cutting by the blade 3 while washing the surface of the semiconductor wafer. This assures an even greater washing effect than in the preceding embodiment.

In either case, it is desirable to supply cooling water to every cut portion, but it is possible to let the washing water serve concurrently as cooling water without supplying any specific cooling water. Although a so-called down-cut method (the method of cutting the wafer downwardly) is employed in either of the above-described two embodiments, it is possible to reverse the directions of arrows A and B, employing an upper-cut method (the method of cutting the wafer upwardly). In either case, it is preferred that washing water 6 is directed in the direction where the cuttings fly out so that the cuttings will not stagnate or settle on the wafer.

Although the present invention finds its best application in cutting of the semiconductor wafers, it can be also effectively applied for cutting of other plate-shaped articles such as glass plates or ceramic plates where it is absolutely required that the plate surface not be soiled or flawed. Also, the grinding method can be applied in case of perfectly segmenting the wafer or in case of forming grooves while leaving out the lower portion of the wafer.

What is claimed is:

1. A method for segmenting a plate-like material into a plurality of individual pellets comprising the steps of:
    a. forming grooves in the surface of said plate-like material by scribing said surface with a rotating grinder blade while causing washing fluid to flow over the entire surface of said plate-like material; and
    b. simultaneously with step (a), spraying a cooling fluid at the contact portion of said blade and the groove surface portion of said plate-like material.

2. A method according to claim 1, wherein the direction in which said cooling fluid is sprayed and the direction in which said working fluid flows over the surface of said plate-like material is the same direction in which said grinder blade rotates at its surface contact with said plate-like material.

3. A method according to claim 1, wherein step (a) comprises moving said rotating grinder blade along longitudinal lines over the surface of said plate-like material, thereby sectioning said material into separate elements, and wherein step (b) comprises spraying said cooling fluid on the scribed portion of said material following the movement of said grinder blade.

4. A method according to claim 3, wherein said plate-like material is disposed in an inclined position with said cooling fluid and said washing fluid flowing down over the inclined material.

5. A method according to claim 1, wherein said washing fluid is applied prior to scribing the surface of said plate-like material with a rotating grinder plate.

6. A method according to claim 1, wherein said washing fluid is kept flowing for a prescribed period of time subsequent to the completion of said scribing.

7. In an apparatus for segmenting a plate-like material into a plurality of individual pellets having a rotating grinder blade forming grooves in the surface of said plate-like material and first means for supplying a cooling fluid thereto, the improvement comprising:
    second means, disposed adjacent to said plate-like material, for causing washing fluid to flow over the entire surface of said plate-like material simultaneously with the supplying of cooling fluid by said first means, to thereby completely wash away cuttings from the surface of said plate-like material.

8. The improvement according to claim 5, wherein said first and second means are arranged so as to cause the cooling and washing fluids to flow in the same direction as the rotational direction of said grinder blade at its surface contact with said plate-like material.

9. The improvement according to claim 8, wherein said grinder blade is arranged to travel along longitudinal lines at the surface of said material and said first and second means are arranged to cause said fluids to flow in the direction of said longitudinal lines.

10. The improvement according to claim 7, wherein said plate-like material is disposed in an inclined position with said cooling fluid and said washing fluid flowing down over the inclined material.

* * * * *